(12) United States Patent
Gumennik et al.

(10) Patent No.: US 10,131,095 B2
(45) Date of Patent: Nov. 20, 2018

(54) TECHNIQUES OF ADDITIVE FABRICATION USING AN ASPHERIC LENS AND RELATED SYSTEMS AND METHODS

(71) Applicant: Formlabs, Inc., Somerville, MA (US)

(72) Inventors: Alexander Gumennik, Brookline, MA (US); Amira Eltony, Vancouver (CA)

(73) Assignee: Formlabs, Inc., Somerville, MA (US)

( * ) Notice: Subject to any disclaimer, the term of this patent is extended or adjusted under 35 U.S.C. 154(b) by 21 days.

(21) Appl. No.: 14/818,990

(22) Filed: Aug. 5, 2015

(65) Prior Publication Data

US 2017/0036398 A1 Feb. 9, 2017

(51) Int. Cl.
| | |
|---|---|
| B29C 67/00 | (2017.01) |
| B33Y 10/00 | (2015.01) |
| B33Y 30/00 | (2015.01) |
| B29C 64/135 | (2017.01) |
| B29C 64/153 | (2017.01) |
| B29C 64/20 | (2017.01) |

(52) U.S. Cl.
CPC ........ B29C 67/0066 (2013.01); B29C 64/135 (2017.08); B29C 64/153 (2017.08); B29C 64/20 (2017.08); B33Y 10/00 (2014.12); B33Y 30/00 (2014.12)

(58) Field of Classification Search
CPC ............ B29C 67/0051; B29C 67/0066; B29C 67/0077; B29C 67/0081; B33Y 10/00; B33Y 30/00
See application file for complete search history.

(56) References Cited

U.S. PATENT DOCUMENTS

| | | | | |
|---|---|---|---|---|
| 5,572,367 | A * | 11/1996 | Jung | G02B 13/18 359/641 |
| 7,453,788 | B2 * | 11/2008 | Yasuda | G01C 21/00 359/708 |
| 7,778,723 | B2 * | 8/2010 | Cregger | B29C 67/0055 264/308 |
| 8,404,173 | B2 * | 3/2013 | Cregger | B29C 67/0055 264/401 |
| 2004/0145997 | A1 * | 7/2004 | Yasuda | G01C 21/00 369/112.24 |
| 2005/0207315 | A1 * | 9/2005 | Nomura | G11B 7/1367 369/112.13 |
| 2006/0192322 | A1 * | 8/2006 | Abe | B22F 3/1055 264/497 |
| 2007/0108644 | A1 * | 5/2007 | Cregger | B29C 67/0055 264/1.37 |
| 2011/0006459 | A1 * | 1/2011 | Cregger | B29C 67/0055 264/401 |
| 2011/0304828 | A1 * | 12/2011 | Khechana | G02B 7/003 353/20 |
| 2016/0067780 | A1 * | 3/2016 | Zediker | B22F 3/1055 219/76.12 |

* cited by examiner

*Primary Examiner* — Ryan M Ochylski
(74) *Attorney, Agent, or Firm* — Wolf, Greenfield & Sacks, P.C.

(57) ABSTRACT

According to some aspects, an additive fabrication device for forming solid objects within a build region is provided, the device comprising a laser source, an aspheric lens configured to receive light emitted by the laser source and to produce a light beam having a circular cross section at at least one position inside the build region, and at least one mirror configured to be actuated to reflect the light beam toward a selected position within the build region.

25 Claims, 7 Drawing Sheets

TECHNIQUES OF ADDITIVE FABRICATION USING AN ASPHERIC LENS AND RELATED SYSTEMS AND METHODS

FIELD OF INVENTION

The present application relates generally to systems and methods for directing light to a target zone, particularly within additive fabrication (e.g., 3-dimensional printing) systems.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or to the bottom surface of the build platform.

SUMMARY

According to some aspects, an additive fabrication device for forming solid objects within a build region is provided, the device comprising a laser source, an aspheric lens configured to receive light emitted by the laser source and to produce a light beam having a circular cross section at at least one position inside the build region, and at least one mirror configured to be actuated to reflect the light beam toward a selected position within the build region.

According to some aspects, a method of forming a solid object via additive fabrication within a build region is provided, the method comprising directing light from a laser source to an aspheric lens such that the lens produces a light beam having a substantially circular cross section between a first distance and a second distance from the lens along a path of the light beam, and directing, using at least one mirror, the light beam toward the build region such that the light beam intersects the build region between the first distance and the second distance from the lens along the path of the light beam.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Systems and methods for directing light to a target zone are provided, and in particular system and method for directing light to a target zone and/or build region within an additive fabrication (e.g., 3-dimensional printing) system. As discussed above, some additive fabrication techniques may form solid objects by successively forming thin layers of material, such as a photopolymer. In such techniques, a photopolymer is typically cured by directing a beam of light produced from a laser source to a portion of the liquid photopolymer, thereby curing it to a solid (or semi-solid) material.

Figure 1A:
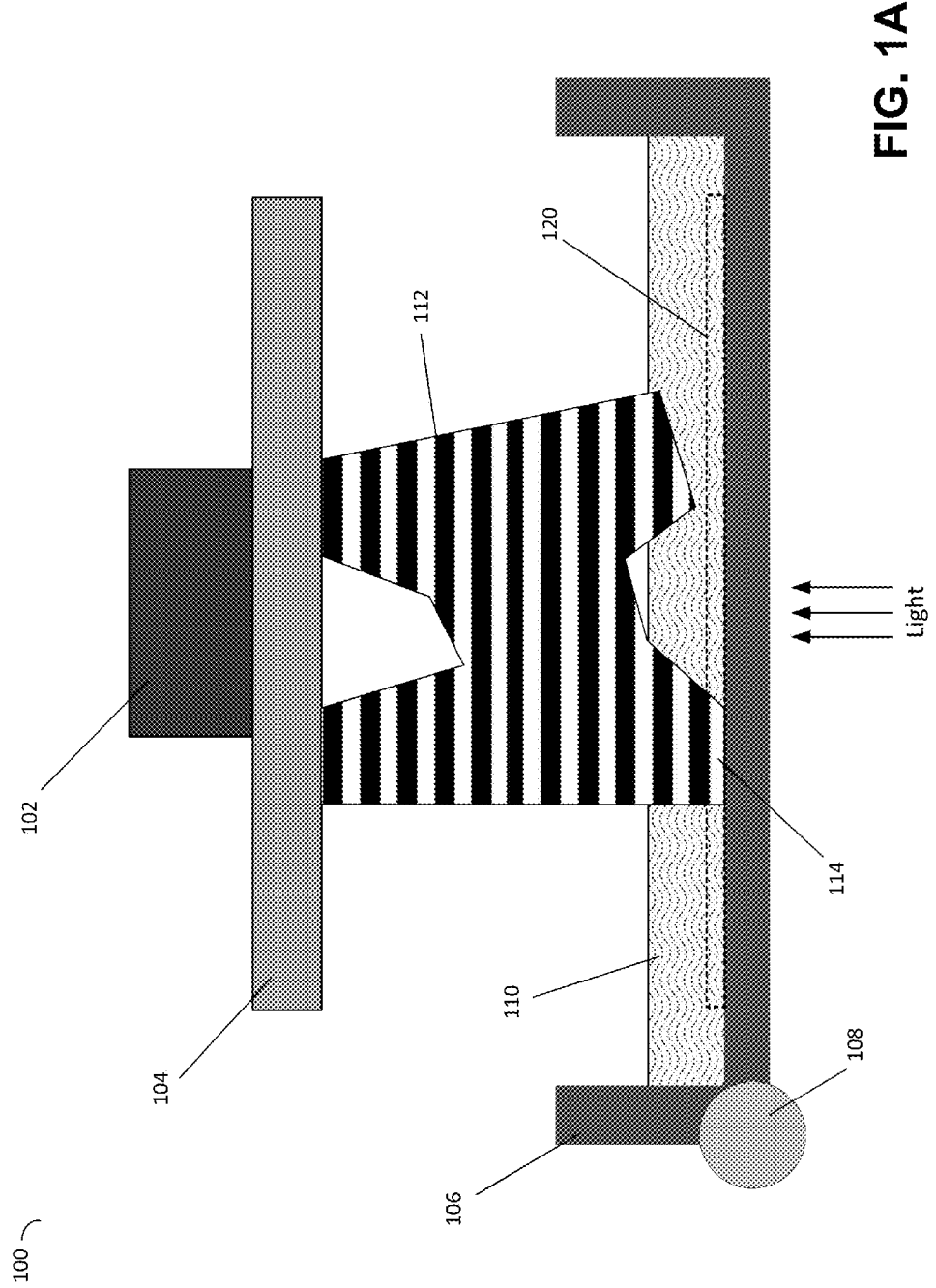
FIG. 1A depicts an illustrative inverse stereolithography system, according to some embodiments.

FIG. 1A depicts one such illustrative additive fabrication system, referred to as an inverse stereolithography system. Stereolithographic printer 100 forms an object 112 by successively curing portions of liquid photopolymer resin 110. An initial layer of the object is formed in contact with a build platform 104, and subsequent layers are each formed in contact with a previously formed layer. In this manner, the object is formed in a downward facing direction. Each layer of the object is formed by positioning the build platform 104 in addition to any previously formed layers of the object such that a thin layer of liquid is produced within the build region 120 (e.g., between the container 106 and a previously formed layer of the object). Light is then directed through the base of the container 106 to cure the liquid in the build region while adhering the cured material to the build platform or previously formed layer. The light may be directed to various points within the build region to selectively cure desired portions of the liquid in the build region, thereby forming layer 114 within the build region. The newly formed layer is also formed in contact with the base of the container 106, but is subsequently separated from the base by rotating the base away from the object about axis 108.

Figure 1B:
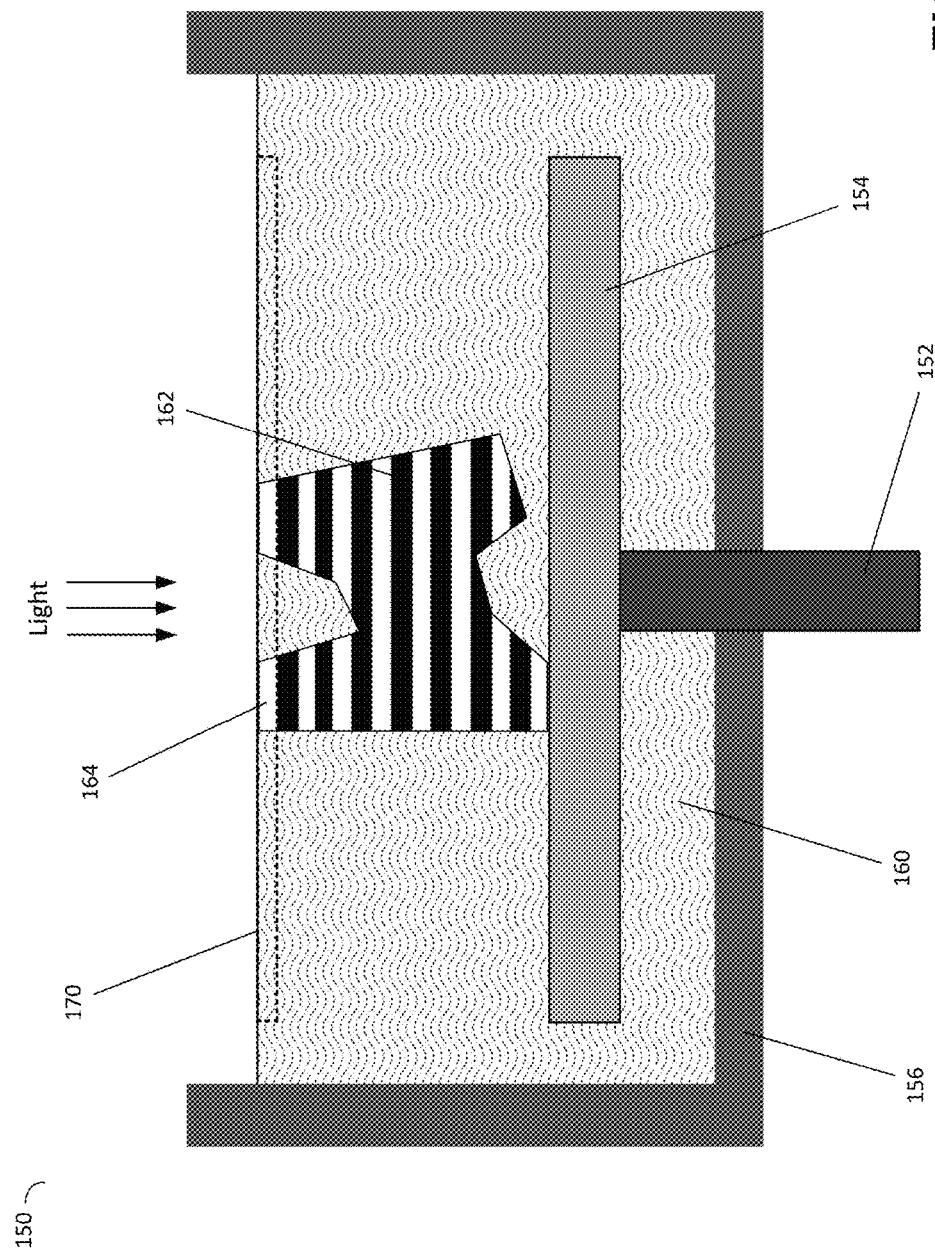
FIG. 1B depicts an illustrative stereolithography system, according to some embodiments.

FIG. 1B depicts another illustrative stereolithography system in which an object is fabricated in an upward facing direction. Stereolithographic printer 150 forms an object 162 by successively curing portions of a reservoir of liquid resin 160. An initial layer of the object is formed in contact with a build platform 154, and subsequent layers are each formed in contact with the previously formed layer. Each layer of the object is formed by positioning the build platform 154 and any previously formed layers of the object such that a thin layer of liquid is produced at the surface of the reservoir within build region 170. Light is then directed at the surface of the liquid reservoir to cure the liquid in the build region while adhering the cured material to the build platform or previously formed layer. Thus, layer 164 may be produced within the build region.

In each of illustrative stereolithography systems 100 and 150, build regions 120 and 170, respectively, occupy static volumes within the system. That is, a build region is a volume in which solid material may be formed to produce a desired object, and while each layer of the formed material (e.g., formed by curing a photopolymer liquid, as described above) may in general have a different shape that other layers of the object, each layer is nonetheless formed within the same volume of space (the build region) within the device.

In order to produce objects via additive fabrication having desired levels of accuracy (e.g., similarly to an intended object shape) and quality (e.g., smooth surface features), it is desirable for a beam of actinic radiation using in the fabrication to have certain characteristics. In some cases, these characteristics may not be present in a beam produced directly from a source of actinic radiation, but may be produced by extensive modification of the source light by way of various lenses and/or prisms. As one example, a single-mode laser diode may be used in order to produce actinic radiation. Light produced by such a diode, however, is typically uncollimated and highly asymmetrical (e.g., with an elliptical cross section). If this light were used unmodified from the diode laser, the asymmetrical nature of the beam may cause material outside of the desired locations to become cured and/or material that is within the desired locations not to be cured. This can produce a phenomena sometimes called "rashing," wherein undesirable rough edges and surfaces are produced on a fabricated object. To correct for the asymmetric properties of the light produced by the laser diode, lenses and/or prisms are typically positioned to produce a light beam that propagates through space with a substantially circular cross section. The collimated beam may then be directed to a desired position within a build region of the system.

The inventors have recognized and appreciated, however, that in additive fabrication the characteristics of the light beam within the build region completely determine the characteristics of a fabricated object. Portions of the light beam's optical path that lie outside of the build region do not directly determine the characteristics of the fabricated object. If the build region occupies a fixed region in space within the device, the characteristics of a fabricated object are therefore completely determined by the beam characteristics within a fixed range of distances from the light source. For instance, in inverse stereolithography, a light beam may be directed to the build region 120 shown in FIG. 1A. If the light beam were to be uncollimated outside of build region 120, and/or have a wider cross section outside of the build region that inside of it, this would have no direct effect on the quality of the objects fabricated from the device. Since build region 120 does not move within the device as the object is formed, the light beam's behavior within only a fixed range of distances from the light source determine the characteristics of the object. The light beam at other distances from the light source simply do not play a direct role in fabrication of the object.

The inventors have further recognized and appreciated that, for applications in which a beam of light with a circular cross section is desirable within a particular narrow region of space (e.g., a build region within a stereolithography system), a single lens may be used to produce such a beam from a laser light source. While the beam may have an elliptical cross section at some positions outside of the region, for additive fabrication applications such positions may be outside of the build region, and accordingly the beam characteristics at such positions do not directly impact the quality of fabricated objects. Use of a single lens may reduce the complexity of the device and thereby simplify construction of an additive fabrication device by reducing the number of components and making it unnecessary to precisely align multiple lenses and/or prisms within the device. Such an approach may also reduce the cost of the device due to the use of a single, rather than multiple, lens and/or prisms.

According to some embodiments, an additive fabrication device as described herein may include an aspheric lens that directs light from a laser source to a build region. The laser source may, for example, be a single-mode laser diode. The light emitted from the laser source may have a beam shape that is determined, at least in part, by a shape of a cavity from which the laser light is output. In some cases, the beam shape may be substantially elliptical in cross section, and have a "fast axis" (the major axis of such an ellipse) and a "slow axis" (the minor axis of the ellipse). An aspheric lens may produce a beam in which the fast and slow axes converge (decrease in size) at different rates as a function of distance from the lens. In this case, there may be at least one distance from the lens at which the sizes of the fast and slow axes are equal. At such a location, the cross section of the beam may be circular. If the aspheric lens is shaped and positioned relative to the laser source appropriately, this distance at which the beam has a circular cross section may be arranged to be in or close to a build region of the additive fabrication device. As used herein, an "aspheric lens" refers to a lens whose surface profile is not a portion of a sphere or cylinder.

According to some embodiments, an aspheric lens is configured to produce a light beam having a substantially circular cross section between a first distance and a second distance from the lens along a path of the light beam. In some additive fabrication devices, a distance along the path of the light beam from the laser source may be different for various points within the build region, and accordingly using a single lens as described herein to direct light to the build region may not produce a beam with a circular cross section at every point within the build region. However, a "target zone" in which the cross section of the light beam is substantially circular may be identified and arranged such that the build region is contained within the target zone. The target zone may be defined by the positions in which the light beam, as directed by an aspheric lens, has a substantially circular cross section between the first distance and the second distance from the lens along a path of the light beam. The beam may have a circular cross section at a third distance, between the first and second distances. One or more points within the build region may be located the third distance from the lens along a path of the light beam.

As used herein, "substantially circular" includes shapes such as ellipses having an ellipticity between 0.8 and 1.2, or between 0.9 and 1.1, or between 0.95 and 1.05. As used herein, "ellipticity" for circles and ellipses is defined as the ratio of one axis to another, so that a circle has an ellipticity of 1 and ellipses have an ellipticity of less than 1 or greater than 1, depending on whether the ratio is of the larger axis to the smaller axis, or vice versa. Moreover, as used herein, a "cross section" of a light beam refers to a cross section through the beam in a direction perpendicular to the beam's propagation direction. As used herein, a "shape" of a cross section refers to a path that connects points exhibiting the same light intensity within the cross section. For instance, a Gaussian intensity profile for which points at the same radius from a center of the beam have the same intensity, may be described as having a circular cross section.

According to some embodiments, an additive fabrication device as described herein may include an aspheric lens with a short effective focal length. For example, an effective focal length of the aspheric lens may be less than 5 mm. In some use cases, a light beam output from the laser source may be approximated by a Gaussian beam (a beam which retains a Gaussian-shaped intensity profile in cross section as it propagates through space). An aspheric lens with a short effective focal length may direct such a beam to a narrowest width (sometimes called the "beam waist") that is a distance from the lens greater than the lens' effective focal length.

Following below are more detailed descriptions of various concepts related to, and embodiments of, systems and methods for directing light to a target zone in additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although particular systems and methods for additive fabrication are described and shown herein, it is envisioned that the functionality of the various disclosed techniques for directing light may be applied to any now known or hereafter devised additive fabrication technique that utilizes light to form solid material from a precursor material, such as, but not limited to, a liquid photopolymer or a powdered material. For instance, as discussed above, a stereolithography technique may be used to form solid material from a liquid photopolymer. However, the techniques for directing light as described herein may also be applied to a powdered material in a selective laser sintering (SLS) device, or within any other additive fabrication technique wherein light is directed to a build region in which solid material is formed.

Figure 2:
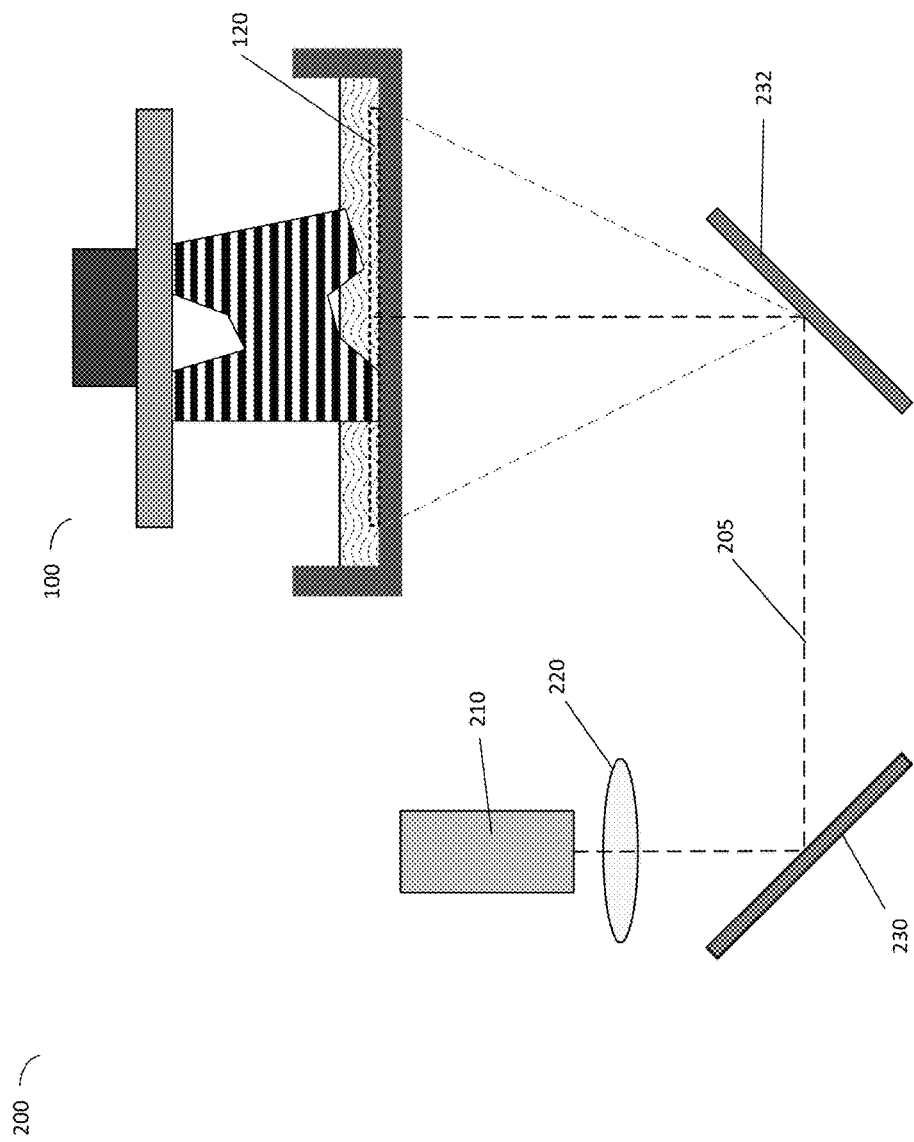
FIG. 2 illustrates the path of a light beam in an illustrative inverse stereolithographic system, according to some embodiments.

FIG. 2 illustrates the path of a light beam in an illustrative inverse stereolithographic system, according to some embodiments. In system 200, the components described above for system 100 described in relation to FIG. 1A are supplied in addition to a laser source 210, a lens 220 and mirrors 230 and 232. The lens and mirrors serve to direct light from the laser source 210 to build region 120. Mirrors 230 and/or 232 may be actuated to reflect light to various points within the build region (the extent of which is depicted as a cone in the example of FIG. 2). Line 205 illustrates the path of the center of the light beam from the laser source 210 to the build region 120.

According to some embodiments, mirrors 230 and 232 may be configured to be actuated about different axes (e.g., axes perpendicular to one another) so that light may be directed towards any location within the three-dimensional build region 120. According to some embodiments, mirror 230 and/or mirror 232 may be configured to be actuated about multiple axes. Each mirror may be actuated using any suitable technique, such as by use of a galvanometer attached to the mirror, which thereby causes the mirror to rotate to a position based on a current supplied to the galvanometer.

It will be appreciated that, in general, any number of mirrors may be used to direct light from the laser source 210 to the build region 120, some or all of which may be actuated. According to some embodiments, two galvanometers each with a mounted mirror may each be actuated along a selected axis, the two selected axes being perpendicular to each other, and the resulting light may further be reflected from a fixed mirror (not shown in FIG. 2).

According to some embodiments, elements 210, 220, 230 and 232 shown in FIG. 2 may be contained within a unit of the additive fabrication system 200 (e.g., located under the components in system 100). In some implementations, the final reflection of the beam (e.g., from mirror 232 in the example of FIG. 2) may be advantageously placed as far from the build region as possible to minimize the variation in beam path length for positions within the build region. For instance, in the example of FIG. 2 light directed to points at the extremities of the build region travels a greater distance from the laser source than light directed to the center of the build region. However, as mirror 232 is located further from the build region, the difference in the path length is proportionately reduced.

According to some embodiments, lens 220 may be any lens that produces a light beam within build region 120 that has a circular cross section for at least one point within the build region. In some implementations, lens 220 is an aspheric lens. In some implementations, lens 220 is an aspheric lens with an effective focal length of less than 5 mm. According to some embodiments, lens 220 comprises glass and/or has an anti-reflective coating. According to some embodiments, a focal length of lens 220 may be less than 10 mm, such as between 1 mm and 8 mm, or between 2 mm and 5 mm, such as 3 mm.

According to some embodiments, lens 220 may be positioned a distance from laser source 210 such that a light beam that has a circular cross section is produced at at least one point within the build region. For instance, the distance from the laser source to the lens may be between 1 mm and 5 mm, such as between 1.5 mm and 2.5 mm, such as 1.7 mm. In some use cases, a change in the laser source to lens distance of order 1 μm may cause a corresponding change in a distance from the lens at which light with a circular cross section is produced on the order of 1 cm. In such use cases, the position of the lens may accordingly be placed and adjusted in a precise location relative to the laser source to produce the desired beam within the build region. According to some embodiments, a diameter of the beam within the build region is between 10 μm and 1 mm, such as between 50 μm and 500 μm, such as between 100 μm and 300 μm.

According to some embodiments, laser source 210 may be a laser diode. Laser diodes are low cost and generally produce light that is non-collimated. In some implementations, the laser source 210 may be a single-mode laser diode. According to some embodiments, lens 220 may be positioned to receive greater than 95% of the light emitted by laser source 210.

It will be appreciated that additional components that do not substantially affect the propagation of the light beam in the example of FIG. 2 may be included within system 200 without substantially altering the beam cross section within the build region, and that the particular components shown in FIG. 2 are used merely for illustration. For example, additional mirrors, filters, etc. may be provided within the path of the light beam that do not substantially alter the beam cross section in the build region from that produced by illustrative system 200.

As discussed above, while a build region may comprise one or more locations at which the light beam has a circular cross section, other locations within the build region may receive light having a close-to-circular cross section. As a means to describe a range of positions that receive light having cross sections that are sufficiently close to circular to produce acceptable additive fabrication output, a "target zone" may be defined as the collection of locations that are between a first distance and a second distance from a light source along the path of the light beam. The light beam at distances along the path of the light beam less than the first distance may be sufficiently non-circular that they do not produce acceptable additive fabrication output (e.g., do not produce objects exhibiting "rashing"). Similarly, the light beam at distances along the path of the light beam greater than the second distance may be sufficiently non-circular that they do not produce acceptable additive fabrication output (with the caveat that, in at least some implementations, the light beam may have a circular cross section at another distance greater than the second distance, as discussed below in relation to FIG. 5).

Figure 3:
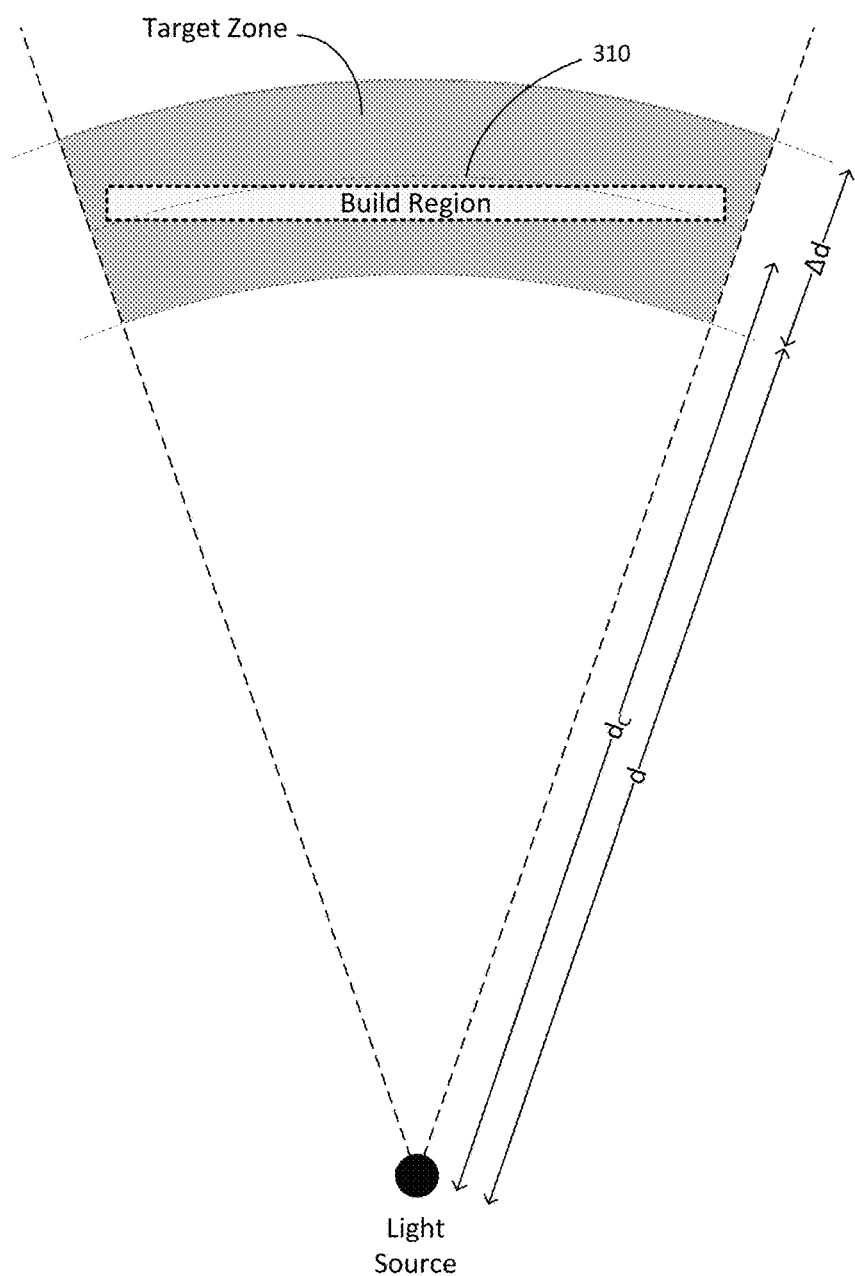
FIG. 3 depicts spatial volumes referred to herein as a target zone and a build region, according to some embodiments.

FIG. 3 depicts an illustrative target zone that includes a build region, according to some embodiments. The light source shown in FIG. 3 may be a laser source or may be a mirror from which the light is emitted (e.g., mirror 232 shown in FIG. 2). In the example of FIG. 3, it is assumed that the light beam is emitted from the light source such that, at a particular distance from the light source $d_c$, the light beam has a circular cross section. The points within the target zone that are a distance $d_c$ from the light source are situated along line 310 (dot-dashed). According to some embodiments, a width of the target zone, labeled Δd in FIG. 3, and which is equal to $2 \times (d_c - d)$, is between 2 mm and 40 mm, such as between 5 mm and 30 mm, such as between 10 mm and 20 mm. According to some embodiments, $d_c$ is between 300 mm and 450 mm, such as between 350 mm and 400 mm, such as between 370 mm and 380 mm.

According to some embodiments, cross sections of the light beam at distances other than $d_c$ may be calculated. The calculated cross sections that, if applied to a precursor material in additive fabrication (e.g., a liquid photopolymer) to form solid material, would produce the solid material with a desired accuracy are identified. The distances corresponding to the acceptable cross sections define the target zone. For instance, in implementations in which the light beam has a circular or elliptical cross section, the target zone may be defined by a range of acceptable ellipticities of the light beam's cross section. For example, it may be determined experimentally that where the light beam's cross section has an ellipticity between 0.8 and 1.2 when applied to a precursor material, objects having acceptable quality are produced from the additive fabrication process. Accordingly, the target zone in such cases may encompass locations in which the received light beam has a cross section with an ellipticity between 0.8 and 1.2.

Irrespective of how the target zone is defined, the build region may preferably be entirely located within the target zone, as shown in FIG. 3. Since the target zone is defined based on the quality of results produced, as indicated above, arranging the build region to fall completely within the target zone may ensure that such results are produced, irrespective of where in the build region material is produced. In the example of FIG. 3, the locations at a distance $d_c$ from the light source intersect with the build region such that every point within the build region is proximate to those locations. It will be appreciated that FIG. 3 illustrates a two-dimensional cross section of the target zone and build region, and that the depicted target zone accordingly has the shape of a portion of a spherical shell in three-dimensions. In the example of FIG. 3, the build region is a cuboid in three-dimensions.

Figure 4A:
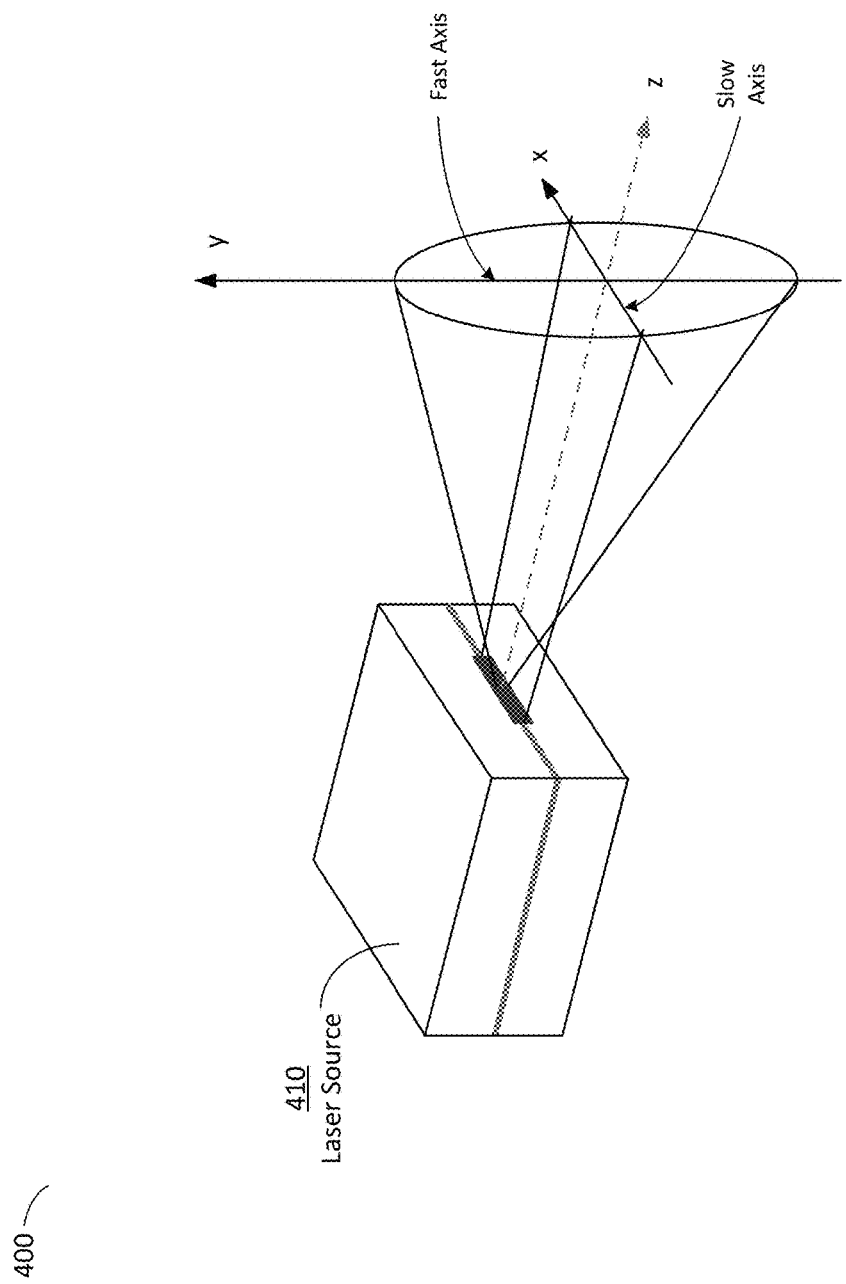
FIG. 4A illustrates a light beam having an elliptical cross section emitted from an illustrative laser source, according to some embodiments.

FIG. 4A illustrates a light beam having an elliptical cross section emitted from an illustrative laser source 410, according to some embodiments. As discussed above, a laser source may produce a light beam having a substantially elliptical cross section, which has a "fast axis" (the major axis in far field) and a "slow axis" (the minor axis in far field). Since the light in these two directions diverges at different rates, the effect that a lens will have on each axis of the light will generally be different.

Conventionally, an additive fabrication device may utilize a pair of anamorphic prisms (or a pair of cylindrical lenses) that each magnify one axis of a light beam with an elliptical cross section, such as the beam shown in FIG. 4A, to produce a beam having a substantially circular cross section. The combination of the two prisms or cylindrical lenses thereby produce a circular beam with a high divergence, which is directed to an additional lens to collimate the beam (that is, to minimize the convergence/divergence). Alternatively, the additional collimating lens may be first used to collimate the light before the pair of anamorphic prisms (or cylindrical lenses) are used to produce a desired beam size. In contrast to these approaches, and as described herein, a single lens may instead be used that affects each axis of the light beam in a different manner simultaneously such that, at a particular distance from the lens, a circular beam is produced.

Figure 4B:
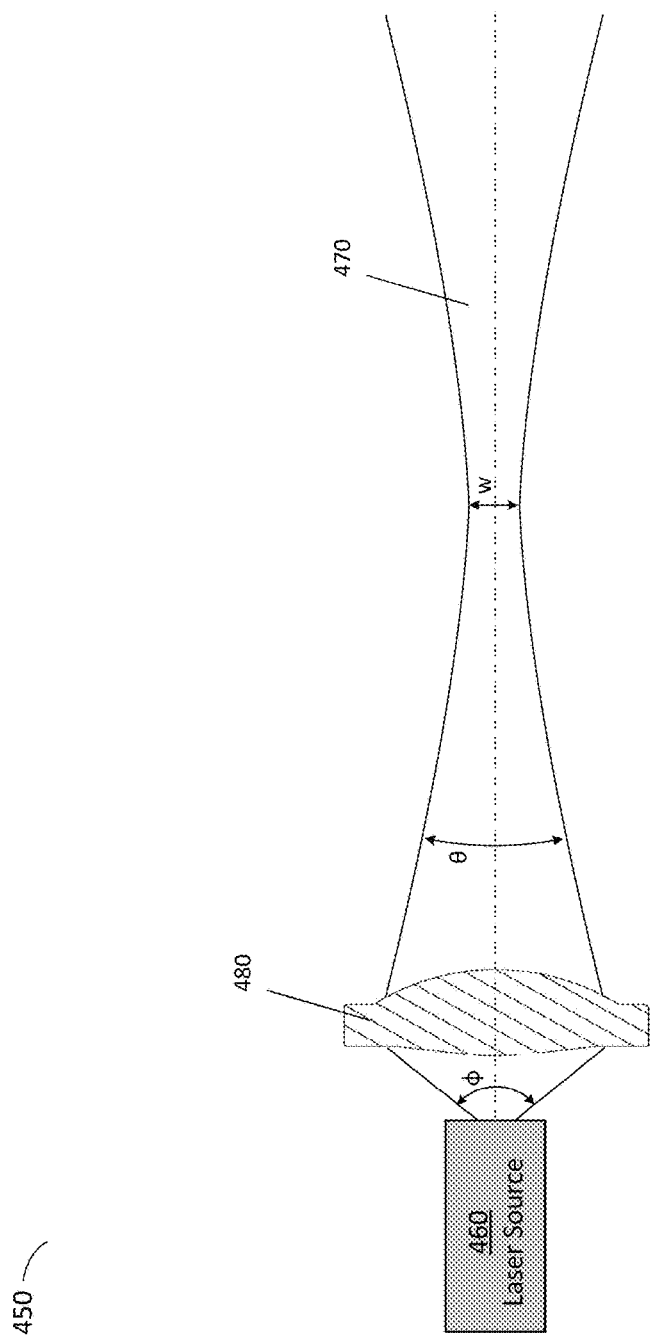
FIG. 4B depicts a light beam emitted by a laser source being directed by an aspheric lens, according to some embodiments.

To illustrate the shape of a light beam after passing through an aspheric lens, FIG. 4B depicts a light beam emitted by a laser source being directed by an aspheric lens, according to some embodiments. In system 450, a laser source 460 produces light which is depicted in FIG. 4B across one axis. The light is directed by lens 480, thereby producing a light beam 470 that may be approximated by the depicted Gaussian beam with a divergence θ and a beam waist w.

In general, both the divergence θ and the beam waist w depend upon the divergence φ of the light entering lens 470 (in addition to other factors, such as the shape of lens 480, the wavelength of the light, etc.). Since, as shown in FIG. 4A, the fast and slow axes of a light beam may exhibit different divergences, the shape of beam 470 may be different for each axis. Accordingly, there may be at least one distance from the lens at which the beam along each axis has the same width, thereby producing a beam that, at that distance or those distances, has a circular cross section.

Figure 5:
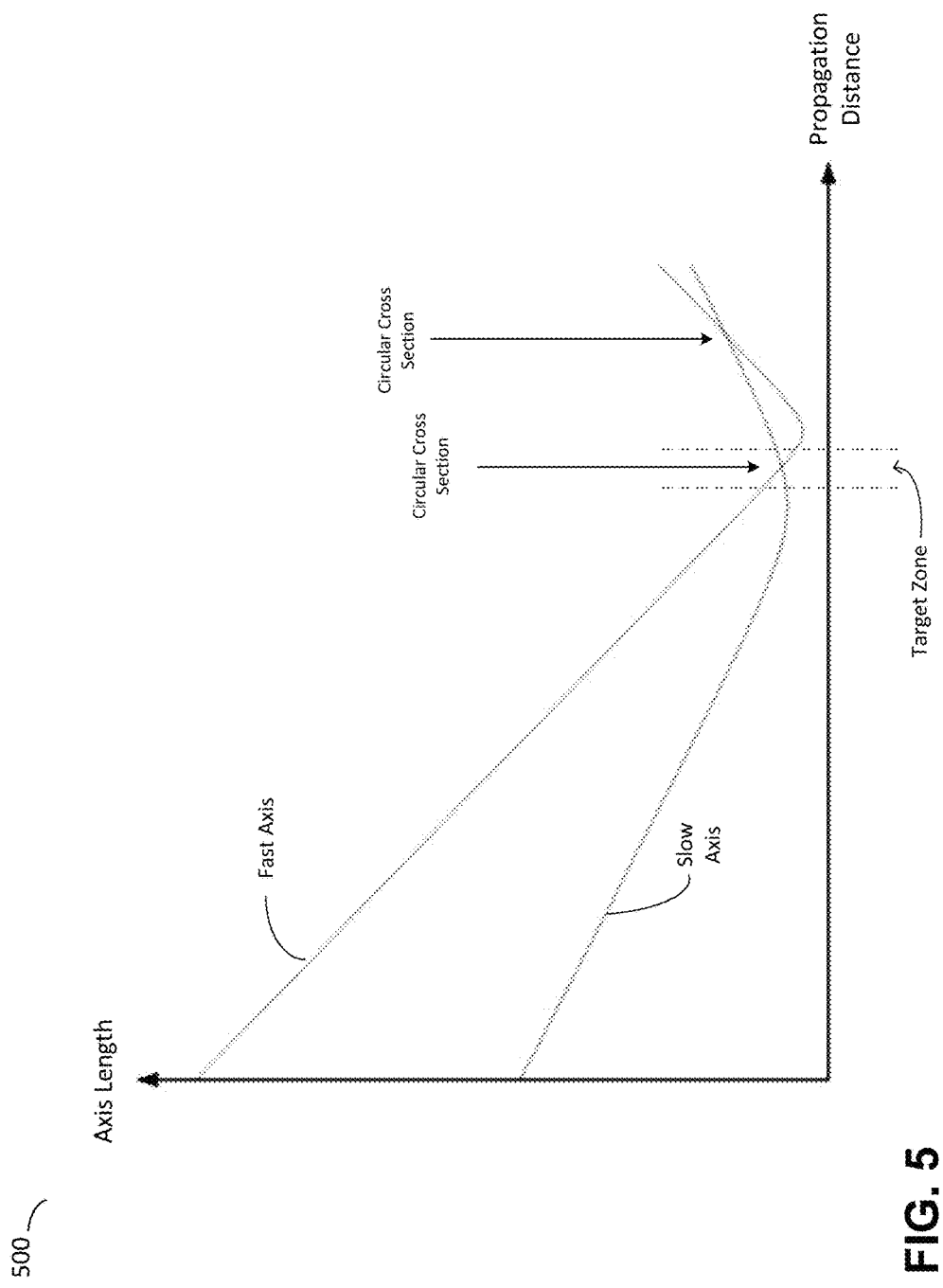
FIG. 5 depicts convergences of the fast and slow axes of a light beam such that a beam having a circular cross section is produced within a target zone, according to some embodiments.

To illustrate this scenario, FIG. 5 depicts convergences of the fast and slow axes of a light beam such that a beam having a circular cross section is produced, according to some embodiments. In the example of FIG. 5, the length of the fast and slow axes of a light beam are shown versus the propagated distance from an aspheric lens. Since the fast axis has a higher divergence entering the lens (as shown, for example, in FIG. 4A) it has a higher length than the slow axis exiting the lens in addition to a higher convergence than the slow axis. Moreover, the beam waist of the fast axis is narrower than that of the slow axis (as shown by the smallest lengths of each axis in the figure). Note that the form of the length of each axis exhibits the form shown in FIG. 4B.

At two points along the path of the light beam, the lengths of the two axes of the light beam's cross section are equal. Accordingly, at these distances, which are noted in FIG. 5, the light beam has a circular cross section. An additive fabrication device may be configured such that light having propagated to one of these distances from the lens may be located within a build region of the device. According to some embodiments, the two distances at which the beam has a circular cross section may have different cross sectional diameters, as can be seen in FIG. 5 by the two different length magnitudes at which the fast and slow axis lengths are equal.

It may be advantageous in some implementations to configure an additive fabrication device to position the smaller of the two cross sectional diameters within a build region so as to provide a more concentrated light to the build region. However, in general the build region may be positioned at any suitable distance from the lens such that at least somewhere within the build region the light beam has a circular cross section.

Note that, in the example of FIG. 5, the focal points of the two axes do not coincide because the emergence source of the fast axis light is effectively offset from the emergence source of the slow axis relative to the lens. According to some embodiments, this offset may be between 2 µm and 10 µm in size, such as 5 µm.

As noted in FIG. 5, and as discussed above, a target zone may be defined that is located in a particular distance range along the beam path from the lens. This target zone may be selected such that the cross section of the light beam is substantially circular within the target zone, and may comprise a distance at which the cross section is circular, as shown in the example of FIG. 5. According to some embodiments, the target zone may include a range of locations that are between 300 mm and 450 mm from the lens along the path of the light beam, such as between 340 mm and 400 mm, such as between 360 mm and 385 mm.

Any suitable aspheric lens may be utilized within a suitable additive fabrication device to produce the behavior shown in FIG. 5 and discussed herein. As one non-limiting example, an additive fabrication device may have the following illustrative features: a single-mode laser diode that produces light having a wavelength between 380 nm and 430 nm (e.g., 405 nm); an aspheric lens with a focal length between 2 mm and 3 mm (e.g., 2.5 mm) located between 1 mm and 2 mm from the laser diode (e.g., 1.7 mm); the lens positioned such that a build region is located between 364 mm and 382 mm along the path of a light beam output from the lens (i.e., the closest portion of the build region to the lens is 364 mm from the lens and the furthest portion is 382 mm from the lens); and the beam of light at a given point within the build region having an ellipticity between 0.9 and 1.1 and a diameter between 100 µm and 200 µm (e.g., 135 µm). In this example, the target zone is defined as being between 364 mm and 382 mm from the lens along the path of the light beam, wherein a distance of 373 mm produces a circular cross section.

As one non-limiting example of a suitable aspheric lens, a lens described by the following lens equation, which defines the surface of the lens in the z-direction as a function of Y-position:

$$z = \frac{Y^2}{R(1 + \sqrt{1-(1+k)Y^2/R^2})} + A_2 Y^2 + A_4 Y^4 + A_6 Y^6 + A_8 Y^8 + A_{10} Y^{10}$$

may have a first side described by the values R=2.979042 mm, k=−12.102853, $A_2$=0, $A_4$=8.068905×10$^{-3}$, $A_6$=−1.725894×10$^{-3}$, $A_8$=1.839072×10$^{-4}$, $A_{10}$=−8.936267×10$^{-6}$; and a second side described by the values R=2.725382 mm, k=−0.542123, $A_2$=0, $A_4$=−2.077710×10$^{-5}$, $A_6$=−1.373930×10$^{-4}$, $A_8$=2.029328×10$^{-5}$, $A_{10}$=−2.961194×10$^{-6}$.

It will be appreciated that, while radiation emitted by a laser source is described herein generically as being "light," any suitable wavelength of electromagnetic radiation may in general be emitted by a laser and directed via the techniques as described herein. For instance, techniques for directing light described herein may be applied to ultraviolet, infrared and/or other non-visible wavelengths of electromagnetic radiation.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device for forming solid objects within a build region, the device comprising:
    a laser source;
    an aspheric lens configured to:
        receive light emitted by the laser source; and
        output a light beam having an ellipticity that changes with distance from the aspheric lens according at least in part to said distance, such that the light beam has a circular cross section at at least one position inside the build region and a non-circular cross section at at least one position outside of the build region; and at least one mirror configured to be actuated to reflect the light beam toward a selected position within the build region.

2. The additive fabrication device of claim 1, wherein the light beam produced by the aspheric lens has an elliptical cross section at at least one position outside the build region.

3. The additive fabrication device of claim 1, wherein the aspheric lens is configured to produce the light beam such that it has an elliptical cross section at the at least one mirror.

4. The additive fabrication device of claim 3, wherein, at all positions inside the build region to which the light beam may be directed, an ellipticity of a cross section of the light beam is no less than 0.8 and no more than 1.2.

5. The additive fabrication device of claim 1, wherein an ellipticity of a cross section of the light beam at the at least one mirror is less than 0.6 or greater than 1.6.

6. The additive fabrication device of claim 1, wherein the laser source comprises a single-mode laser diode.

7. The additive fabrication device of claim 6, wherein the laser source emits light with a wavelength between 380 nm and 430 nm.

8. The additive fabrication device of claim 1, wherein an effective focal length of the aspheric lens is less than 5 mm.

9. The additive fabrication device of claim 1, wherein a distance from the laser source to the aspheric lens is less than 3 mm.

10. The additive fabrication device of claim 1, wherein a path length of the light beam from the aspheric lens to the build region is between 350 mm and 450 mm.

11. The additive fabrication device of claim 1, wherein a diameter of the circular cross section is between 50 μm and 200 μm.

12. The additive fabrication device of claim 1, wherein the aspheric lens comprises glass and includes an anti-reflective coating.

13. The additive fabrication device of claim 1, wherein the additive fabrication device is configured to form solid objects by curing a liquid photopolymer within the build region using the light beam.

14. The additive fabrication device of claim 1, wherein the additive fabrication device is configured to form solid objects by sintering powdered material within the build region using the light beam.

15. The additive fabrication device of claim 1, wherein circular cross section of the light beam has an ellipticity of 1 and wherein the non-circular cross section of the light beam has an ellipticity greater than 1 or less than 1.

16. The additive fabrication device of claim 1, wherein the circular cross section is a cross section through the light beam at an angle perpendicular to the light beam's axis.

17. A method of forming a solid object via additive fabrication within a build region, the method comprising:
    directing light from a laser source to an aspheric lens such that the lens outputs a light beam having an ellipticity that changes with distance from the aspheric lens according at least in part to said distance, such that the light beam has a circular cross section between a first distance and a second distance from the lens along a path of the light beam and a non-circular cross section at at least one position closer to the lens than the first distance; and
    directing, using at least one mirror, the light beam toward the build region such that the light beam intersects the build region between the first distance and the second distance from the lens along the path of the light beam.

18. The method of claim 17, further comprising directing, using the at least one mirror, the light beam toward a plurality of positions in the build region, thereby forming a layer of the object.

19. The method of claim 17, wherein the circular cross section of the light beam has an ellipticity of no less than 0.8 and no more than 1.2.

20. The method of claim 19, wherein a difference between the first and second distances from the lens is at least 2 mm and no more than 40 mm.

21. The method of claim 19, wherein the circular cross section of the light beam has an ellipticity of no less than 0.9 and no more than 1.1.

22. The method of claim 21, wherein the circular cross section of the light beam has an ellipticity of no less than 0.95 and no more than 1.05.

23. The method of claim 17, further comprising curing at least a portion of a photopolymer within the build region using the light beam.

24. The method of claim 17, wherein a diameter of the circular cross section is between 100 μm and 200 μm.

25. The method of claim 17, wherein the circular cross section is a cross section through the light beam at an angle perpendicular to the light beam's axis.

* * * * *